Patented Feb. 10, 1925.

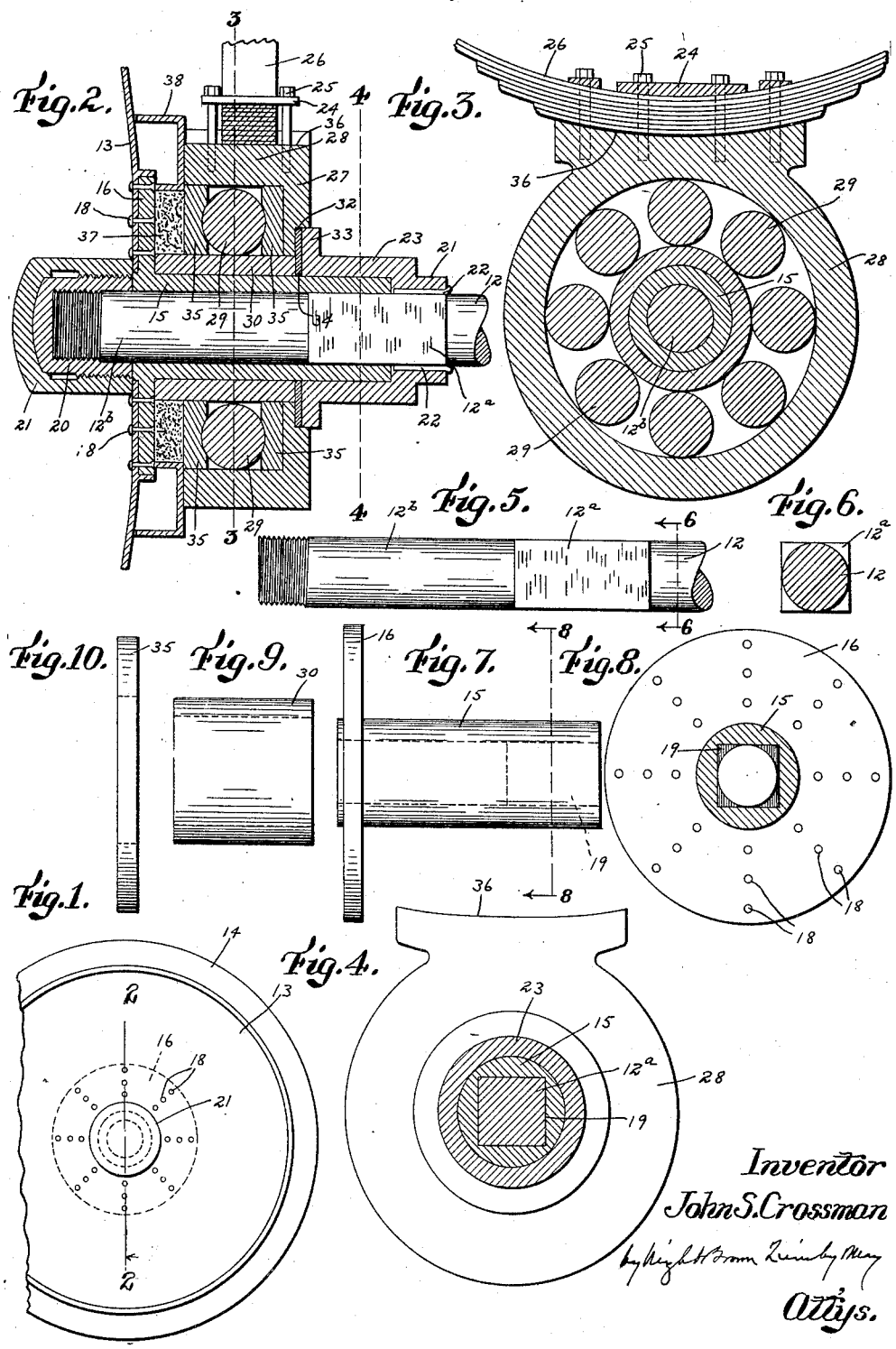

1,525,680

UNITED STATES PATENT OFFICE.

JOHN S. CROSSMAN, OF ALLSTON, BOSTON, MASSACHUSETTS.

MOTOR VEHICLE.

Application filed May 22, 1923. Serial No. 640,804.

*To all whom it may concern:*

Be it known that I, JOHN S. CROSSMAN, a citizen of the United States, residing at 51 Allston Street, Allston, Boston, in the county of Suffolk and State of Massachusetts, have invented new and useful Improvements in Motor Vehicles, of which the following is a specification.

This invention is embodied in certain improvements relating to the rear or driving axle of a motor vehicle, means securing a driving wheel to a driven member of the usual axle, and antifriction means for supporting the load through the usual rear springs entirely by the wheel, without subjecting the driven axle member to stresses and strains liable to fracture the same.

Of the accompanying drawings forming a part of this specification—

Figure 1 is a side elevation looking toward the outer side of one of the rear wheels of a motor vehicle in which my invention is embodied.

Figure 2 is a section on line 2—2 of Figure 1.

Figure 3 is a section on line 3—3 of Figure 2.

Figure 4 is a section on line 4—4 of Figure 2.

Figure 5 is a side view of a portion of the driven axle member.

Figure 6 is a section on line 6—6 of Figure 5.

Figure 7 is a side view of the hub member hereinafter described.

Figure 8 is a section on line 8—8 of Figure 7.

Figure 9 is a side view of the reinforcing sleeve hereafter described.

Figure 10 is an edge view of one of the rings hereinafter described.

The same reference characters indicate the same parts in all the figures.

In the drawings, 12 designates a driven member or shaft constituting an element of the usual rear or driving axle of a motor vehicle, driven by any suitable mechanism (not shown), and provided with a polygonal or squared wheel-driving portion 12$^a$.

The rear or driving wheels, one of which is shown, may be of any suitable type, the wheel in this instance being of the disk type and including an annular web 13, and a tire 14. The wheel may be of any other suitable construction.

To the central portion of the wheel is rigidly attached a tubular hub member 15, preferably of nickel steel, having at one end a flange 16, perforated as shown by Figure 8, to receive rivets 18 attaching the flange to the wheel. The bore of the member 15 is enlarged and squared at one end portion to form a socket 19 (Figure 8), receiving the squared portion 12$^a$ of the axle member 12, to provide a driving connection between the said member and the hub member.

The axle member 12 has a cylindrical end portion 12$^b$ extending through and projecting from the hub member 15, and screw-threaded to engage a nut 20 which is seated on one end of the member 15, as shown by Figure 2. An internally threaded cap 21 is screwed upon the nut 20.

To the squared portion 12$^a$ of the axle member is detachably secured a stop member, which I call a shoulder case, composed of a hub portion 21, formed internally to fit the squared portion and secured thereto by keys 22 (Figure 1), and an enlarged annular portion 23, receiving one end of the hub member 15.

A member which I call a truss cylinder is secured, as by clamping plates 24 and bolts 25 to one of the usual springs 26, interposed between the rear portion of the chassis and the rear axle, and suitably secured to the chassis. This member includes an end portion 27, surrounding the axle and hub members, and an annular portion 28 concentric with said members, and forming the outer wall of an annular race containing rolling antifriction members, which may be either balls 29, or rolls, and may be spaced apart by a suitable cage not shown. The inner wall of said race may be formed by the hub member 15, but is preferably formed by a cylindrical tube or sleeve 30, of nickel steel, surrounding a portion of the member 15 and taking the wear of the rolling members 29, the sleeve being adapted to rotate with the member 15, and constituting an enlargement or reinforcement thereof. The end portion 27 preferably has an annular recess 32, receiving a portion of an outwardly projecting annular flange 33 on the shoulder case, said end portion including a packing washer 34, of any suitable compressible material, in rubbing contact with the truss cylinder.

Flat-sided steel rings 35 are preferably inserted in the truss cylinder, and form the annular end faces of the ball race. The truss cylinder is provided at its upper portion with a seat 36, for the under side of the spring 26.

It will now be seen that the hub member 15 is rigidly attached by the flange 16 to the body of the wheel, and projects from the inner side of the wheel, and that the hub member cooperates with the wheel in supporting the chassis load through the rolling members 29, the truss cylinder and the body spring. The axle member 12 is therefore entirely relieved of the duty of supporting the load.

The antifriction bearing is located in close proximity to the wheel and at the inner side thereof, and the load pressure is aligned directly over the bearing, and exerts a balanced pressure thereon so that the load is carried independently of the axle member, and exerts no bending strain thereon.

Packing 37 may be interposed between the hub member flange and the adjacent ball-race ring 35, as shown by Figure 2. A brake drum 38 is shown somewhat conventionally by Figure 2, the drum being fixed to the wheel in any suitable way.

It will be seen that the ball or roller bearings are housed in and protected by the truss cylinder, and require no other protection.

The flange 16 is shown by Figure 2 as bearing on the inner side of the wheel web 13. The flange may, however, bear on the outer side of the web, this being preferable in some cases.

I claim:

1. A motor vehicle comprising, in combination, a driven wheel, a tubular hub member having a flange at its outer end rigidly attached to the wheel, the hub member projecting from the inner side of the wheel, a driven axle member positively engaged with the hub member to drive the latter, a truss cylinder surrounding the hub member, said cylinder being located beside the wheel and at the inner side thereof, and provided with a seat for a load-supporting spring and with means for attaching said spring to the seat, the truss cylinder forming a fixed element of a ball race surrounding the hub member and located beside and at the inner side of the wheel, rolling members housed in said ball race, and a stop member fixed to the axle member and in rubbing contact with the inner end of the truss cylinder, the arrangement being such that the rolling members are supported by the wheel and the flanged hub member, at the inner side of, and in close proximity to the wheel, and in vertical alignment with the load-supporting spring, so that the weight of a chassis portion, supported by said spring, exerts a balanced pressure on the bearing and is supported entirely by the wheel, the hub member, the rolling members, and the truss cylinder, without strain on the axle member.

2. A motor vehicle embodying the combination specified by claim 1, the said axle member having a polygonal driving portion and the said hub member a polygonal socket fitting said driving portion, the said stop member being embodied in a shoulder case detachably secured to the driving portion of the axle member and in rubbing contact with the truss cylinder.

In testimony whereof I have affixed my signature.

JOHN S. CROSSMAN.